United States Patent
Tang et al.

(10) Patent No.: US 8,399,576 B2
(45) Date of Patent: Mar. 19, 2013

(54) PHOSPHORUS CONTAINING NOVALAC PHENOL RESINS, METHODS FOR MANUFACTURING THE SAME, AND FORMULAE CONTAINING THE SAME

(75) Inventors: Shang-Wei Tang, Taipei (TW); Hsueh-Tso Lin, Taipei (TW); Kuan-Ching Chen, Taipei (TW); Dick Zhong, Taipei (TW)

(73) Assignee: Grand Tek Advance Material Science Co., Ltd., Taipei (TW)

( * ) Notice: Subject to any disclaimer, the term of this patent is extended or adjusted under 35 U.S.C. 154(b) by 204 days.

(21) Appl. No.: 13/021,447

(22) Filed: Feb. 4, 2011

(65) Prior Publication Data
US 2012/0172546 A1 Jul. 5, 2012

(30) Foreign Application Priority Data
Jan. 5, 2011 (TW) ................. 100100285

(51) Int. Cl.
*C08G 2/30* (2006.01)
(52) U.S. Cl. ........ 525/480; 525/481; 525/538; 528/129; 528/153; 528/167; 528/480; 528/491
(58) Field of Classification Search .......... 525/480, 525/481, 538; 528/129, 153, 167, 480, 491
See application file for complete search history.

(56) References Cited

U.S. PATENT DOCUMENTS

| | | |
|---|---|---|
| 6,291,626 B1 | 9/2001 | Wang et al. |
| 6,319,432 B1 | 11/2001 | Harrod et al. |
| 6,605,736 B1 | 8/2003 | Nakamura et al. |
| 6,605,737 B1 | 8/2003 | Nakamura et al. |
| 6,613,848 B1 | 9/2003 | Wang et al. |
| 6,613,928 B1 | 9/2003 | Nakamura et al. |
| 6,797,821 B2 | 9/2004 | Wang et al. |
| 6,992,151 B2 | 1/2006 | Wang et al. |
| 7,064,157 B2 | 6/2006 | Hwang et al. |

FOREIGN PATENT DOCUMENTS

| | | | |
|---|---|---|---|
| JP | 2002-097242 | * | 4/2002 |
| JP | 2007-291210 | * | 11/2007 |

OTHER PUBLICATIONS

Shieh, Journal of Applied Polymer Science, vol. 78, 1636-1644 (2000).*

* cited by examiner

*Primary Examiner* — Robert C Boyle
(74) *Attorney, Agent, or Firm* — Muncy, Geissler, Olds & Lowe, PLLC

(57) ABSTRACT

Disclosed is a phosphorous containing phenol novolac resin, having a structure as below:

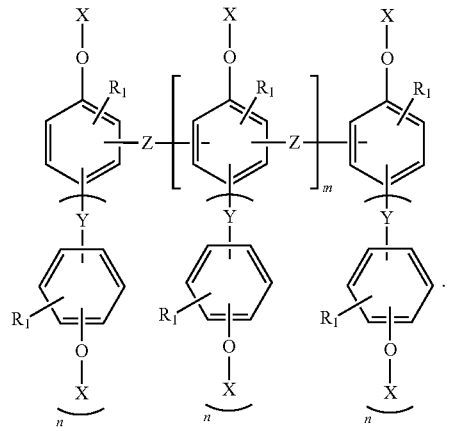

In the above formula, Z is selected from — or —$CH_2$—. Each Y is independently selected from —, —$CH_2$—, —$C(CH_3)_2$—, —S—, —$SO_2$—, —O—, —CO—, or —N=N—. Each X is independently selected from a hydrogen or phosphorous containing group, wherein the hydrogen and phosphorous containing group have a molar ratio of 1:0.1 to 0.1:1. Each $R_1$ is independently selected from a hydrogen or $C_{1-5}$ alkyl group. Each $R_2$ is independently selected from a $C_{1-5}$ alkyl group. m is an integer of 1 to 10, and n is 0 or 1.

15 Claims, No Drawings

PHOSPHORUS CONTAINING NOVALAC PHENOL RESINS, METHODS FOR MANUFACTURING THE SAME, AND FORMULAE CONTAINING THE SAME

CROSS REFERENCE TO RELATED APPLICATIONS

This Application claims priority of Taiwan Patent Application No. 100100285, filed on Jan. 5, 2011, the entirety of which is incorporated by reference herein.

BACKGROUND OF THE INVENTION

1. Field of the Invention

The present invention relates to phosphates, and in particular relates to curing agents of phosphorous containing phenol novolac resins, methods for manufacturing the same, and compositions including the same.

2. Description of the Related Art

Flame retardants can be classified into two major types: an organic type and an inorganic type. A high amount of the inorganic flame retardant is added to a resin for flame retardation effect; however, an overly high additive amount of the inorganic flame retardant contrarily degrades physical properties of the resin. The organic flame retardant can be further classified into a halogen containing group and a phosphorous containing group. The halogen containing flame retardant produces hydrogen halide and a lot of smoke while burning and therefore is harmful for human beings. Accordingly, the phosphorous containing flame retardant is the main type used for developing organic flame retardants.

The flame retardation effect of the phosphorous containing flame retardant depends on the phosphorous amount of phosphide. In addition, the flame retardant in the resin will be exposed to a high temperature when the resin is compression-molded. As such, developing a phosphide containing a high phosphorous amount with excellent thermal stability is necessary.

In the past, typical phosphorous containing flame retardants were of a monomer type such as triphenyl phosphate (TPP) or trucresyl phosphate (TCP). Because monomer has low molecular weight, it easily vaporizes when in use. A condensed phosphoric ester, including a very low amount of volatile component, has been developed to overcome the vaporization defect. See U.S. Pat. Nos. 6,319,432, 6,605,736, 6,605,737, and 6,613,928.

A phenol novolac resin inherently has excellent properties such as low cost, high thermal resistance, high water resistance, high electrical insulation, high corrosion resistance, high mechanical strength, good adhesion, and low smoke generation. Components of the phenol novolac resin can be tuned in different amounts to obtain a modified phenol novolac resin with different properties. The modified phenol novolac resin is widely applied in molding materials, gelling adhesives, or coatings. If the phosphorous is combined with the phenol novolac resin, a product thereof will have the inherent advantages of the phenol novolac resin, a high phosphorous amount, and excellent flame retardation effect. The conventional modified phenol novolac resins containing phosphorous are obtained by combining DOPO and the phenol novolac resin. See Journal of Applied Polymer Science, Vol. 78, 1636-1644 (2000), Polymer 42(2001) 7617-7625, and U.S. Pat. Nos. 6,291,626, 6,613,848, 6,797,821, 6,992,151, and 7,064,157.

BRIEF SUMMARY OF THE INVENTION

One embodiment of the disclosure provides a phosphorous containing phenol novolac resin, having a structure as below:

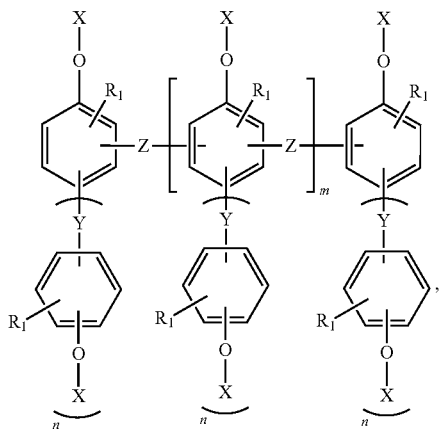

wherein Z is selected from — or —CH2-, each Y is independently selected from —, —CH2-, —C(CH3)2-, —S—, —SO2-, —O—, —CO—, or —N=N—, each X is independently selected from a hydrogen or phosphorous containing group, wherein the hydrogen and phosphorous containing group have a molar ratio of 1:0.1 to 0.1:1, and the phosphorous containing group has a structure as below:

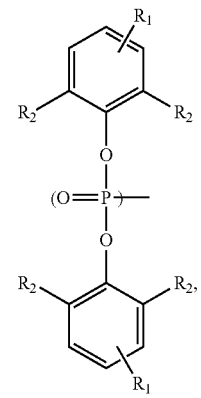

wherein each $R_1$ is independently selected from a hydrogen or $C_{1-5}$ alkyl group, each $R_2$ is independently selected from a $C_{1-5}$ alkyl group, m is an integer of 1 to 10, and n is 0 or 1.

One embodiment of the disclosure provides a method of forming a phosphorous containing phenol novolac resin, comprising: reacting a phenol and a phosphoryl chloride together to form a phosphorous containing chloride as below:

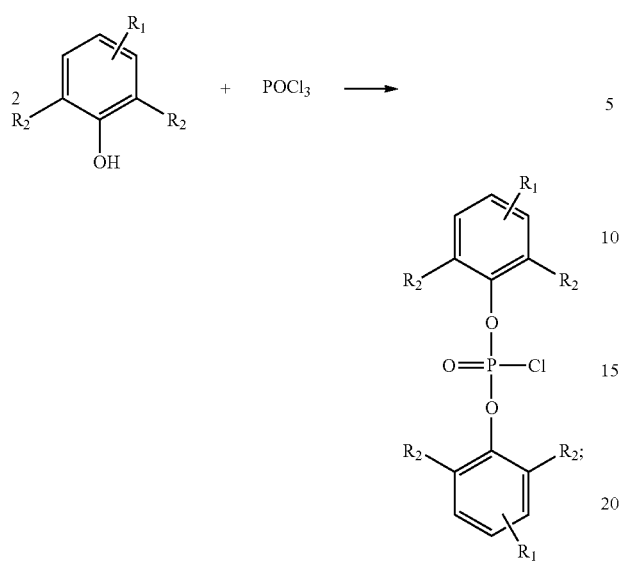

and reacting the phosphorous containing chloride and a phenol novolac resin to form a phosphorous containing phenol novolac resin as below:

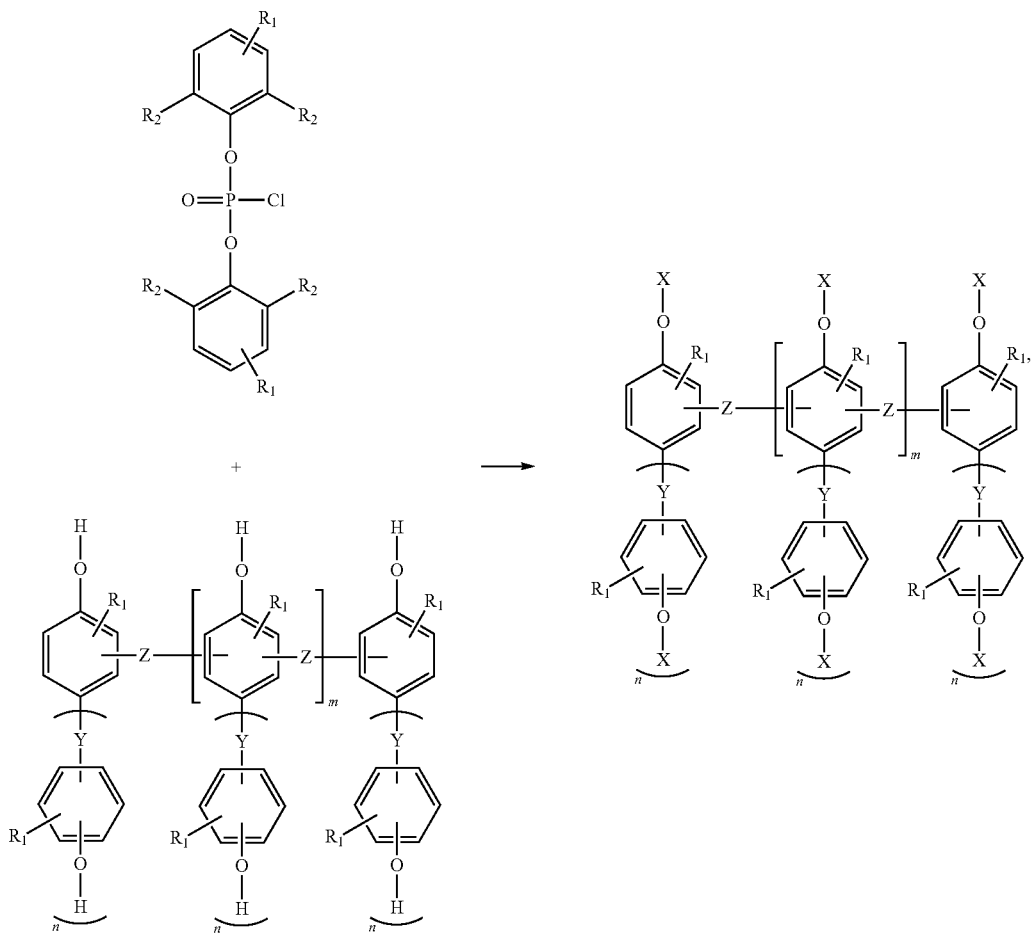

wherein Z is selected from — or —$CH_2$—, each Y is independently selected from —, —$CH_2$—, —$C(CH_3)_2$—, —S—, —$SO_2$—, —O—, —CO—, or —N=N—, each X is independently selected from a hydrogen or phosphorous containing group, wherein the hydrogen and phosphorous containing group have a molar ratio of 1:0.1 to 0.1:1, and the phosphorous containing group has a structure as below:

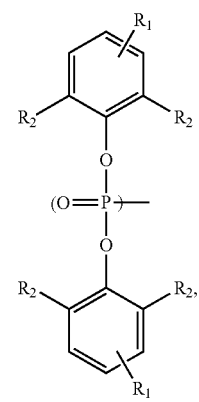

wherein each $R_1$ is independently selected from a hydrogen or $C_{1-5}$ alkyl group, each $R_2$ is independently selected from a $C_{1-5}$ alkyl group, m is an integer of 1 to 10, and n is 0 or 1.

One embodiment of the disclosure provides a phosphorous containing formula, comprising: an amount equal to or greater than 45 weight % of the phosphorous containing the described phenol novolac resin; and an amount equal to or less than 55 weight % of a resin.

A detailed description is given in the following embodiments with reference to the accompanying drawings.

DETAILED DESCRIPTION OF THE INVENTION

The following description is the best-contemplated mode of carrying out the invention. This description is made for the purpose of illustrating the general principles of the invention and should not be taken in a limiting sense. The scope of the invention is best determined by reference to the appended claims.

In one embodiment, the phosphorous containing phenol novolac resin is manufactured as below. First, 2 parts by mole of phenol and 1 to 1.2 parts by mole of phosphoryl chloride ($POCl_3$) are reacted as shown in Formula 1.

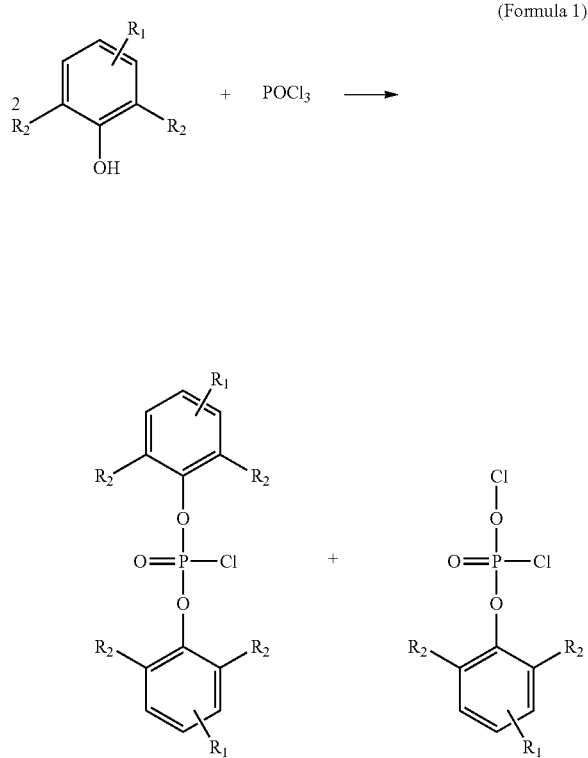

(Formula 1)

In Formula 1, each $R_1$ is independently selected from a hydrogen or $C_{1-5}$ alkyl group. Each $R_2$ is independently selected from a $C_{1-5}$ alkyl group. In the described reaction, the major product is the left product with a yield of 90% to 95%, and the minor product is the right product with a yield of 5% to 10%. The side product, e.g. hydrochloric acid gas (HCl), produced during the reaction can be recovered through water under a normal atmosphere or a reduced atmosphere.

In one embodiment, the phenol in Formula 1 includes dimethyl phenol, diethyl phenol, 3-ethyl-2-methyl phenol, 4-ethyl-2-methyl phenol, 5-ethyl-2-methyl phenol, 6-ethyl-2-methyl phenol, 4-ethyl-3-methyl phenol, 5-ethyl-3-methyl phenol, 2-ethyl-3-methyl phenol, 2-ethyl-4-methyl phenol, 2-ethyl-5-methyl-phenol, 3-ethyl-4-methyl phenol, di-n-propyl phenol, di-iso-propyl phenol, di-n-butyl phenol, di-sec-butyl phenol, di-tert-butyl phenol, di-n-pentyl phenol, di-iso-pentyl phenol, di-sec-pentyl phenol, di-neo-butyl phenol, trimethyl phenol, triethyl phenol, tripropyl phenol, the likes, or combinations thereof.

In some embodiments, Lewis acid such as metal halide, serving as a catalyst, can be added to the reaction in Formula 1. The suitable metal halide for the disclosure includes anhydrous magnesium chloride, anhydrous aluminum trichloride, titanium tetrachloride, or combinations thereof.

In one embodiment, the reaction of Formula 1 is performed at a temperature of 80° C. to 155° C., and the temperature can be raised in three steps. The temperature of the first step is 80° C. to 110° C., preferably 90° C. to 110° C., and more preferably 100° C. to 110° C. The temperature of the second step is 110° C. to 135° C., preferably 120° C. to 135° C., and more preferably 130° C. to 135° C. The temperature of the third step is 135° C. to 155° C., preferably 145° C. to 155° C., and more preferably 150° C. to 155° C.

In one embodiment, the reaction of Formula 1 is performed for a period of 3 hours to 27 hours, and the period may collocate with the three raised temperature steps. The period of the first step is 1 hour to 4 hours, and preferably 2 hours to 3 hours. The period of the second step is 1 hour to 4 hours, and preferably 2 hours to 3 hours. The period of the third step is 1 hour to 20 hours, and preferably 4 hours to 12 hours.

Subsequently, 1 part by mole of the major product in Formula 1 and 1 to 2 parts by mole of phenol novolac resin are reacted to form a phosphorous containing phenol novolac resin, as shown in Formula 2.

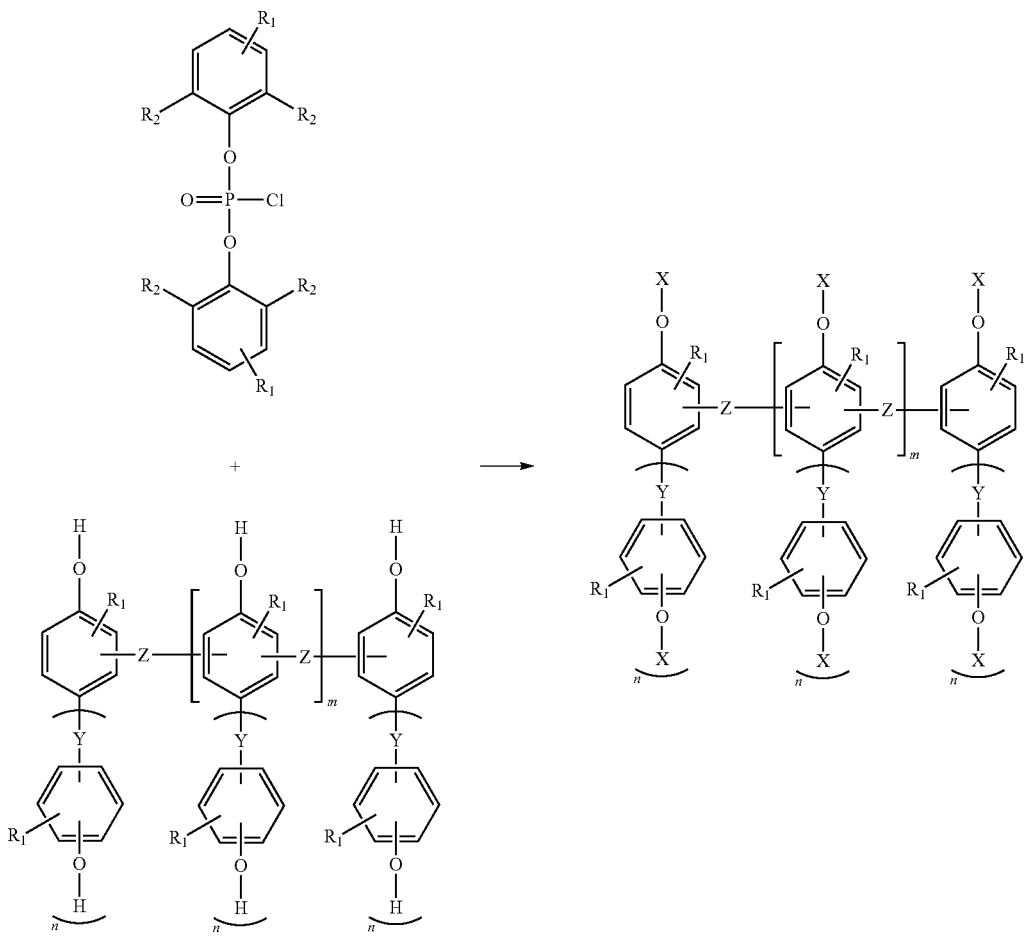

(Formula 2)

In Formula 2, each X is independently selected from a hydrogen or phosphorous containing group, wherein the hydrogen and phosphorous containing group have a molar ratio of 1:0.1 to 0.1:1, and the phosphorous containing group has a structure as shown in Formula 3. An overly low molar ratio of the phosphorous containing group will make the product have low phosphorous content and poor flame retardation effect. On the other hand, an overly high molar ratio of the phosphorous containing group will make the product have low hydroxyl content and poor reactivity with other epoxy resins.

(Formula 3)

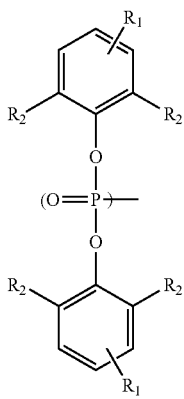

In Formula 2, Z is selected from — or —$CH_2$—, and each Y is independently selected from —, —$CH_2$—, —C($CH_3$)$_2$—, —S—, —$SO_2$—, —O—, —CO—, or —N=N—. m is an integer of 1 to 10, and n is 0 or 1. In Formulae 2 and 3, each $R_1$ is independently selected from a hydrogen or $C_{1-5}$ alkyl group, and each $R_2$ is independently selected from a $C_{1-5}$ alkyl group.

The phenol novolac resin includes (ortho or para)-cresol-formaldehyde resin, bisphenol A novolac resin, bisphenol F novolac resin, bisphenol S novolac resin, other phenol novolac resin having hydroxyl groups, or combinations thereof.

In one embodiment, the reaction of Formula 2 is performed at a temperature of 100° C. to 180° C., and the temperature can be raised in two steps. The temperature of the first step is 100° C. to 150° C., and preferably 120° C. to 140° C. The temperature of the second step is 140° C. to 180° C., and preferably 150° C. to 170° C.

In one embodiment, the reaction of Formula 2 is performed for a period of 2 hours to 22 hours, and the period may collocate with the two raised temperature steps. The period of the first step is 1 hour to 4 hours, and preferably 2 hours to 3 hours. The period of the second step is 1 hour to 20 hours, and preferably 8 hours to 12 hours.

Solvent such as toluene, (ortho, meta, or para)-xylene, (1,2,3, 1,2,4, or 1,3,5)-trimethyl benzene, or combinations thereof can be added to the reaction of Formula 1 and/or 2 to benefit the reaction. In one embodiment, 5 g to 50 g of solvent can be added for each part by mole of phosphoryl chloride.

The impurity of the reaction, e.g. non-reacted reactants, residue catalyst, hydrochloric acid gas, and the likes, can be removed by an aqueous acid wash, aqueous base wash, distillation water wash, vacuumed distillation, and the likes. The aqueous acid includes hydrochloric acid, acetic acid, oxalic acid, sulfuric acid, phosphoric acid, nitric acid, or the likes. The aqueous base includes sodium hydroxide, potassium hydroxide, sodium carbonate, sodium bicarbonate, or the likes.

To prevent the color of the phosphorous containing phenol novolac resin product in Formula 2 from changing, phosphate (e.g. triphenyl phosphate or tri(2,6-di-iso-butyl)phosphate) or sterically hindered phenol (e.g. 2,6-di-tert-butyl-p-cresol or 2-methyl-6-tert-butyl-p-cresol) can be added thereto.

The phosphorous containing phenol novolac resin product in Formula 2 has a weight-average molecular weight of about 2000 to 8500, and preferably about 3500 to 7000. The phosphorous containing phenol novolac resin product having an overly high weight-average molecular weight will have high viscosity and therefore be difficult to synthesize. The phosphorous containing phenol novolac resin product having an overly low weight-average molecular weight will have low crosslink degree when further being reacted with an epoxy resin. The phosphorous containing phenol novolac resin has a phosphorous content of greater than 5 weight %, preferably greater than 8 weight %. The phosphorous content is enhanced by increasing the X ratio of the product in Formula 2. The reactions in Formulae 1 and 2 may yield the phenol novolac resin containing high phosphorous content by simple washing and neutralizing processes without complicated purifying processes, thereby efficiently reducing manufacturing costs.

The disclosure further applies the phosphorous containing phenol novolac resin to a phosphorous containing formula. For example, phosphorous containing formula may be equal to or greater than 45 weight % of the phosphorous containing phenol novolac resin as described above, and equal to or less than 55 weight % of a resin. An overly high ratio of the phosphorous containing phenol novolac resin will raise a cost of the phosphorous containing formula without dramatically benefiting the flame retardation effect thereof. Meanwhile, an overly low ratio of the phosphorous containing phenol novolac resin will lower the flame retardation effect of the phosphorous containing formula. The resin can be a thermoplastic resin or a thermosetting resin. In one embodiment, the thermoplastic resin includes polystyrene resin, polyamide resin, polyester resin, polycarbonate resin, or combinations thereof. In one embodiment, the thermosetting resin includes epoxy resin, phenolic resin, urea resin, polyurethane resin, or combinations thereof.

Accordingly, the phosphorous containing phenol novolac resin of the disclosure not only has high phosphorous content, and good flame retardation effect, but also has inherent thermal stability at high temperatures.

EXAMPLES

Example 1

244 g of 2,6-dimethyl phenol (2.00mol), 7.51 g of anhydrous magnesium chloride (0.08 mol), 160 g of phosphoryl chloride (1.04 mol), and 10 g xylene were mixed together. The mixture was gradually heated to 110° C. to react for 2 hours, then heated to 130° C. to react for 2 hours, then heated to 155° C. to react for 6 hours, and then vacuumed to 150 mmHg to react for 4 hours. The reaction is shown as Formula 4.

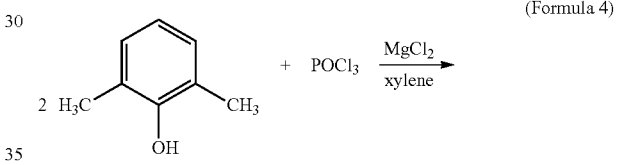

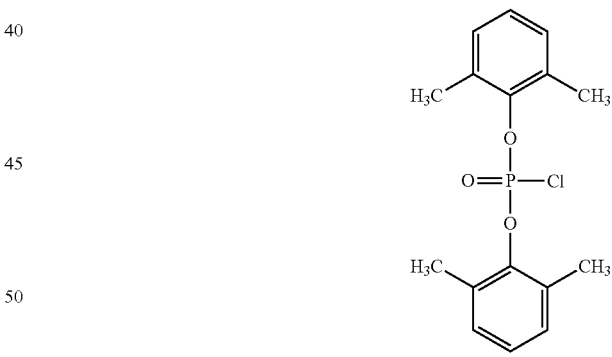

(Formula 4)

The reacted mixture of Formula 4 was cooled to 135° C. 212 g of ortho-cresol-formaldehyde resin (2.00 mol, KI-3500 commercially available from K.L. CHEMICALS CO., LTD, Taiwan), 3.5 g of anhydrous aluminum chloride (0.03 mmol) and 10 g of xylene were added to the cooled mixture, then heated to 140° C. to react for 2 hours, then heated to 160° C. to react for 12 hours, and then vacuumed to 150 mmHg to react for 4 hours. The described reaction is shown as Formula 5.

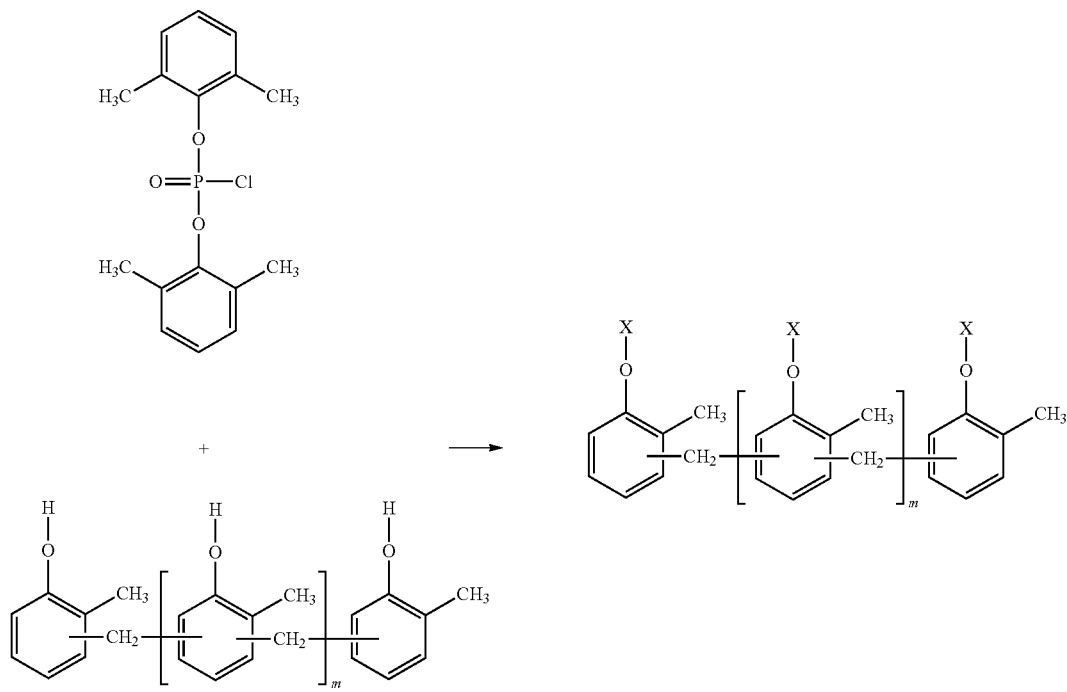

(Formula 5)

The reacted mixture of Formula 5 was cooled to 135° C. 400 g of butanone was added to the cooled mixture to form a solution, and the butanone solution was cooled to room temperature. The cooled butanone solution was poured into a washing tank, and 200 g of butane was then added thereto. The butanone solution was then washed by a 1% hydrochloric acid aqueous solution, then washed by a 10% sodium hydroxide aqueous solution, and then washed by distillation water to obtain a brown oil. The brown oil was vacuumed distillated to remove solvent thereof for obtaining 425 g of a dark yellow oil product with a yield of 85%. In Formula 5, X of the product is a hydrogen or phosphorous containing group as shown in Formula 6, wherein the hydrogen and phosphorous containing group have a molar ratio of 1:1, as determined by GPC.

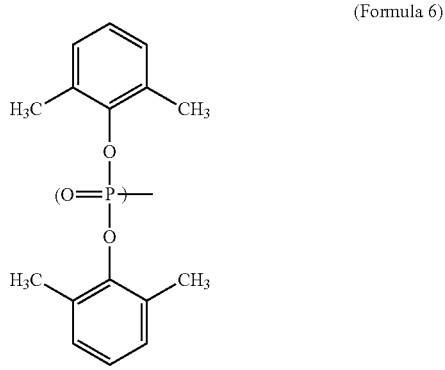

(Formula 6)

90 g of the described phosphorous containing phenol novolac resin was added to 107 g of an ortho-cresol epoxy resin (NPCN-704 commercially available from Nanya Plastics Co.) and then cured. The cured product had a flame retardation effect of V0 degree tested by the UL 94 standard.

Example 2

244 g of 2,6-dimethyl phenol (2.00 mol), 7.51 g of anhydrous magnesium chloride (0.08 mol), 160 g of phosphoryl chloride (1.04 mol), and 10 g xylene were mixed together. The mixture was gradually heated to 110° C. to react for 2 hours, then heated to 130° C. to react for 2 hours, then heated to 155° C. to react for 6 hours, and then vacuumed to 150 mmHg to react for 4 hours. The reaction is shown as Formula 4.

The reacted mixture of Formula 4 was cooled to 135° C. 240 g of a bisphenol A novolac resin (2.00 mol, RI-5300 commercially available from K.L. CHEMICALS CO., LTD, Taiwan), 3.5 g of anhydrous aluminum chloride (0.03 mmol) and 10 g of xylene were added to the cooled mixture, then heated to 140° C. to react for 2 hours, then heated to 160° C. to react for 12 hours, and then vacuumed to 150 mmHg to react for 4 hours. The described reaction is shown as Formula 7.

(Formula 7)

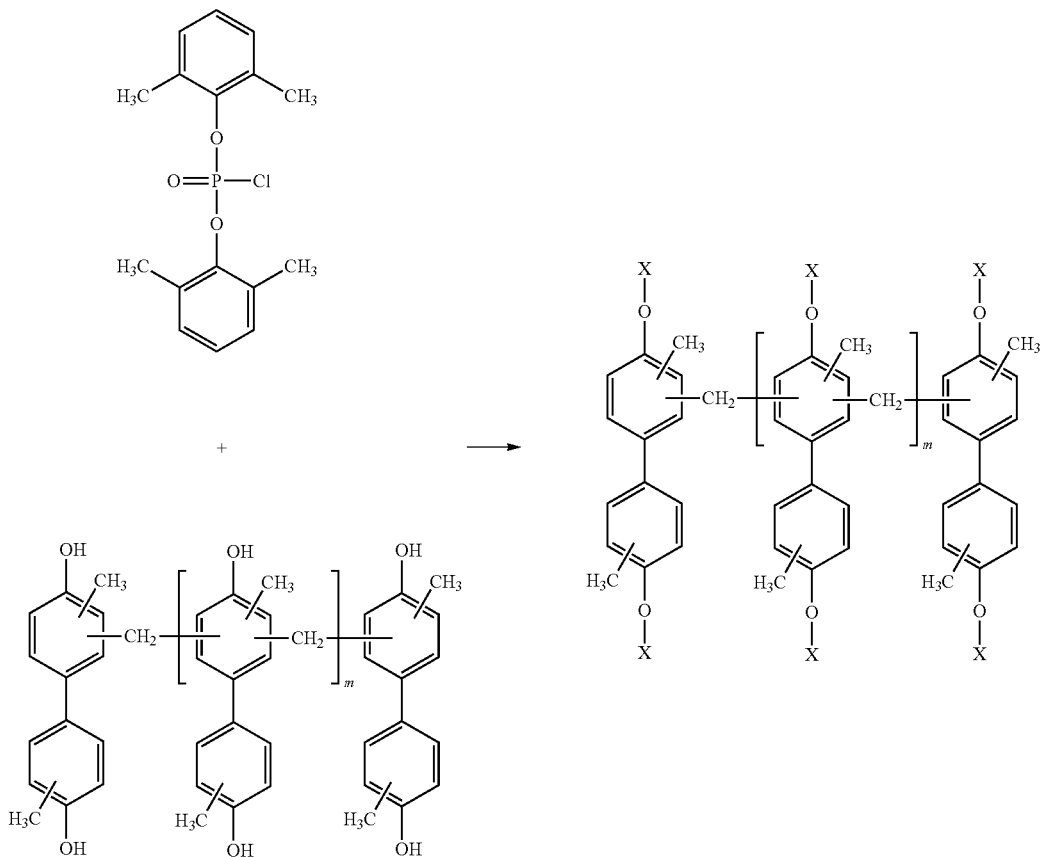

The reacted mixture of Formula 7 was cooled to 135° C. 400 g of butanone was added to the cooled mixture to form a solution, and the butanone solution was cooled to room temperature. The cooled butanone solution was poured into a washing tank, and 200 g of butane was then added thereto. The butanone solution was then washed by a 1% hydrochloric acid aqueous solution, then washed by a 10% sodium hydroxide aqueous solution, and then washed by distillation water to obtain a brown oil. The brown oil was vacuumed distillated to remove solvent thereof for obtaining 422 g of dark brown oil product with a yield of 80%. In Formula 7, X of the product is a hydrogen or phosphorous containing group as shown in Formula 6, wherein the hydrogen and phosphorous containing group have a molar ratio of 1:1, as determined by GPC.

90 g of the described phosphorous containing phenol novolac resin was added to 107 g of an ortho-cresol epoxy resin (NPCN-704 commercially available from Nanya Plastics Co.) and then cured. The cured product had a flame retardation effect of V0 degree tested by the UL 94 standard.

Example 3

244 g of 2,6-dimethyl phenol (2.00 mol), 7.51 g of anhydrous magnesium chloride (0.08 mol), 160 g of phosphoryl chloride (1.04 mol), and 10 g xylene were mixed together. The mixture was gradually heated to 110° C. to react for 2 hours, then heated to 130° C. to react for 2 hours, then heated to 155° C. to react for 6 hours, and then vacuumed to 150 mmHg to react for 4 hours. The reaction is shown as Formula 4.

The reacted mixture of Formula 4 was cooled to 135° C. 141 g of ortho-cresol-formaldehyde resin (1.33 mol, KI-3500 commercially available from K.L. CHEMICALS CO., LTD, Taiwan), 3.5 g of anhydrous aluminum chloride (0.03 mmol) and 10 g of xylene were added to the cooled mixture, then heated to 140° C. to react for 2 hours, then heated to 160° C. to react for 12 hours, and then vacuumed to 150 mmHg to react for 4 hours. The described reaction is shown as Formula 5.

The reacted mixture of Formula 5 was cooled to 135° C. 400 g of butanone was added to the cooled mixture to form a solution, and the butanone solution was cooled to room temperature. The cooled butanone solution was poured into a washing tank, and 200 g of butane was then added thereto. The butanone solution was then washed by a 1% hydrochloric acid aqueous solution, then washed by a 10% sodium hydroxide aqueous solution, and then washed by distillation water to obtain a brown oil. The brown oil was vacuumed distillated to remove solvent thereof for obtaining 364 g of brown oil product with a yield of 85%. In Formula 5, X of the product is a hydrogen or phosphorous containing group as shown in Formula 6, wherein the phosphorous containing group and the hydrogen have a molar ratio of 1:0.3, as determined by GPC.

90 g of the described phosphorous containing phenol novolac resin was added to 107 g of an ortho-cresol epoxy resin (NPCN-704 commercially available from Nanya Plastics Co.) and then cured. The cured product had a flame retardation effect of V0 degree tested by the UL 94 standard.

Comparative Example 1

90 g of a non-phosphorous novolac resin (KI-3500 commercially available from K.L. CHEMICALS CO., LTD, Taiwan) was added to 107 g of an ortho-cresol epoxy resin (NPCN-704 commercially available from Nanya Plastics Co.) and then cured. The cured product failed to have a flame retardation effect of V0 degree (only HB degree) tested by the UL 94 standard.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A phosphorous containing phenol novolac resin, having a structure as below:

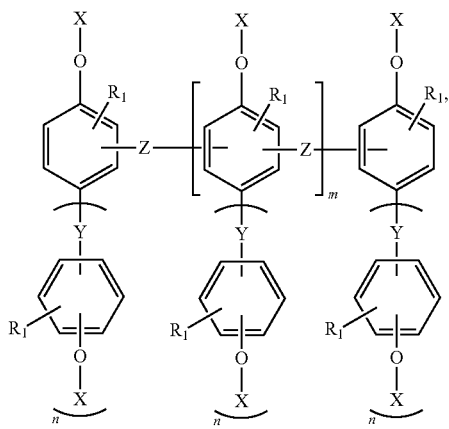

wherein: Z is selected from — or —$CH_2$—; and
each Y is independently selected from —, —$CH_2$—, —$C(CH_3)_2$—, —S—, —$SO_2$—, —O—, —CO—, or —N=N—; and
each X is independently selected from a hydrogen or phosphorous containing group, wherein the hydrogen and phosphorous containing group have a molar ratio of 1:0.1 to 0.1:1, and the phosphorous containing group has a structure as below:

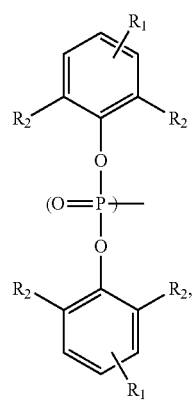

wherein: each $R_1$ is independently selected from a hydrogen or $C_{1-5}$ alkyl group,
each $R_2$ is independently selected from a $C_{1-5}$ alkyl group;
m is an integer of 1 to 10; and
n is 0 or 1.

2. The phosphorous containing phenol novolac resin as claimed in claim 1, having a weight-average molecular weight of 2000 to 8500.

3. A phosphorous containing formula, comprising:
an amount equal to or greater than 45 weight % of the phosphorous containing phenol novolac resin as claimed in claim 1; and
an amount equal to or less than 55 weight % of a resin.

4. The phosphorous containing formula as claimed in claim 3, wherein the resin comprises a thermoplastic resin or a thermosetting resin.

5. The phosphorous containing formula as claimed in claim 4, wherein the thermoplastic resin comprises polystyrene resin, polyamide resin, polyester resin, polycarbonate resin, or combinations thereof.

6. The phosphorous containing formula as claimed in claim 4, wherein the thermosetting resin comprises epoxy resin, phenolic resin, urea resin, polyurethane resin, or combinations thereof.

7. A method of forming a phosphorous containing phenol novolac resin, comprising:
reacting a phenol and a phosphoryl chloride together to form a phosphorous containing chloride as below:

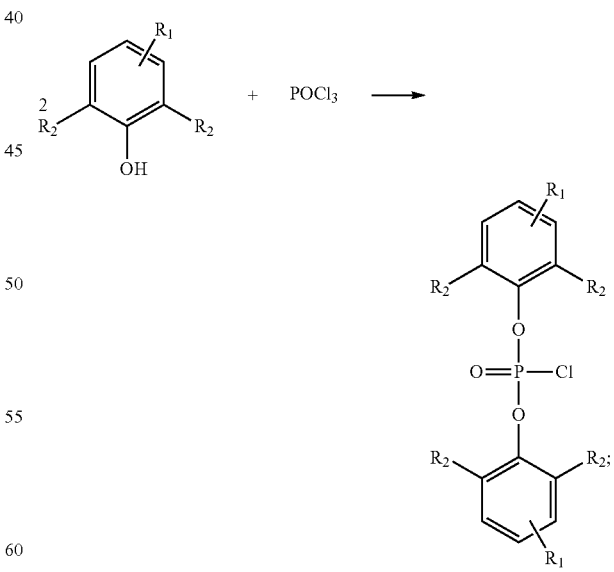

and reacting the phosphorous containing chloride and a phenol novolac resin to form a phosphorous containing phenol novolac resin as below:

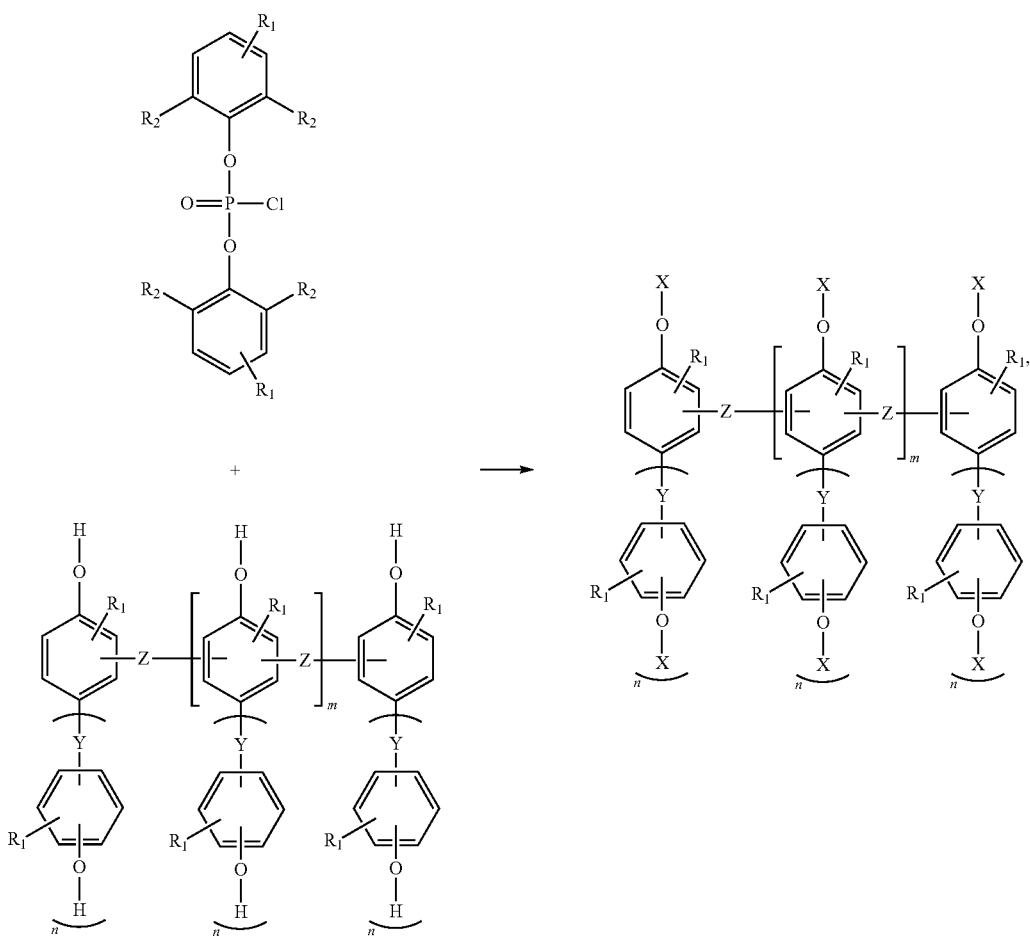

wherein: Z is selected from — or —CH$_2$—; and each Y is independently selected from —, —CH$_2$—, —C(CH$_3$)$_2$—, —S—, —SO$_2$—, —O—, —CO—, or —N═N—; and each X is independently selected from a hydrogen or phosphorous containing group, wherein the hydrogen and phosphorous containing group have a molar ratio of 1:0.1 to 0.1:1, and the phosphorous containing group has a structure as below:

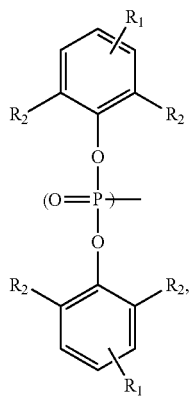

wherein: each R$_1$ is independently selected from a hydrogen or C$_{1-5}$ alkyl group;

each R$_2$ is independently selected from a C$_{1-5}$ alkyl group;

m is an integer of 1 to 10; and n is 0 or 1.

8. The method as claimed in claim 7, wherein the step of reacting the phenol and the phosphoryl chloride together to form the phosphorous containing chloride further comprises adding a catalyst of metal halide.

9. The method as claimed in claim 8, wherein the metal halide comprises anhydrous magnesium chloride, anhydrous aluminum trichloride, titanium tetrachloride, or combinations thereof.

10. The method as claimed in claim 7, wherein the phenol comprises dimethyl phenol, diethyl phenol, 3-ethyl-2-methyl phenol, 4-ethyl-2-methyl phenol, 5-ethyl-2-methyl phenol, 6-ethyl-2-methyl phenol, 4-ethyl-3-methyl phenol, 5-ethyl-3-methyl phenol, 2-ethyl-3-methyl phenol, 2-ethyl-4-methyl phenol, 2-ethyl-5-methyl-phenol, 3-ethyl-4-methyl phenol, di-n-propyl phenol, di-iso-propyl phenol, di-n-butyl phenol, di-sec-butyl phenol, di-tert-butyl phenol, di-n-pentyl phenol, di-iso-pentyl phenol, di-sec-pentyl phenol, di-neo-butyl phenol, trimethyl phenol, triethyl phenol, tripropyl phenol, or combinations thereof.

11. The method as claimed in claim 7, wherein the step of reacting the phenol and the phosphoryl chloride together to form the phosphorous containing chloride is performed at a temperature of 80° C. to 150° C. for a period of 3 hours to 27 hours.

12. The method as claimed in claim 7, wherein the phenol novolac resin comprises (ortho or para)-cresol-formaldehyde resin, bisphenol A novolac resin, bisphenol F novolac resin, bisphenol S novolac resin, or combinations thereof.

13. The method as claimed in claim 7, wherein the step of reacting the phosphorous containing chloride and the phenol novolac resin together to form the phosphorous containing phenol novolac resin is performed at a temperature of 100° C. to 180° C. for a period of 2 hours to 22 hours.

14. The method as claimed in claim 7, wherein the step of reacting the phenol and the phosphoryl chloride together to form the phosphorous containing chloride and/or the step of reacting the phosphorous containing chloride and the phenol novolac resin together to form the phosphorous containing phenol novolac resin further comprises adding a solvent.

15. The method as claimed in claim 14, wherein the solvent comprises toluene, (ortho, meta, or para)-xylene, (1,2,3, 1,2, 4, or 1,3,5)-trimethyl benzene, or combinations thereof.

* * * * *